(12) United States Patent
Bärecke et al.

(10) Patent No.: US 12,472,951 B2
(45) Date of Patent: Nov. 18, 2025

(54) METHOD FOR OPERATING A TRANSPORTATION VEHICLE, COMPUTER PROGRAM PRODUCT AND TRANSPORTATION VEHICLE

(71) Applicant: VOLKSWAGEN AKTIENGESELLSCHAFT, Wolfsburg (DE)

(72) Inventors: Frank Bärecke, Wolfsburg (DE); Leon Salzwedel, Braunschweig (DE)

(73) Assignee: VOLKSWAGEN AKTIENGESELLSCHAFT GERMANY (DE)

( * ) Notice: Subject to any disclaimer, the term of this patent is extended or adjusted under 35 U.S.C. 154(b) by 198 days.

(21) Appl. No.: 18/366,563

(22) Filed: Aug. 7, 2023

(65) Prior Publication Data

US 2024/0059293 A1    Feb. 22, 2024

(30) Foreign Application Priority Data

Aug. 19, 2022 (DE) ............... 10 2022 208 643.0

(51) Int. Cl.
| | | |
|---|---|---|
| *B60W 30/182* | (2020.01) | |
| *B60W 40/09* | (2012.01) | |
| *B60W 50/02* | (2012.01) | |
| *B60W 50/023* | (2012.01) | |
| *B60W 50/038* | (2012.01) | |
| *B60W 50/14* | (2020.01) | |
| *B60W 50/16* | (2020.01) | |

(52) U.S. Cl.
CPC ......... *B60W 30/182* (2013.01); *B60W 40/09* (2013.01); *B60W 50/16* (2013.01); *B60W 2400/00* (2013.01); *B60W 2540/30* (2013.01)

(58) Field of Classification Search
None
See application file for complete search history.

(56) References Cited

U.S. PATENT DOCUMENTS

| | | | | |
|---|---|---|---|---|
| 7,639,148 B2 * | 12/2009 | Victor | ............... | B60W 50/087 |
| | | | | 340/576 |
| 8,359,137 B2 | 1/2013 | Feder et al. | | |
| 9,233,687 B2 * | 1/2016 | Niemann | ............ | B60W 50/038 |
| 2013/0158741 A1 | 6/2013 | Hahne | | |
| 2021/0162971 A1 | 6/2021 | Brenn et al. | | |

FOREIGN PATENT DOCUMENTS

| | | |
|---|---|---|
| DE | 19838490 A1 | 12/1999 |
| DE | 102007002748 A1 | 7/2008 |
| DE | 102010062484 A1 | 6/2012 |

(Continued)

OTHER PUBLICATIONS

Machine English translation WO2012076215 (Year: 2012).*

*Primary Examiner* — Jason Holloway
*Assistant Examiner* — Atticus A Cameron
(74) *Attorney, Agent, or Firm* — BARNES & THORNBURG LLP

(57) ABSTRACT

A method for operating a transportation vehicle having a vehicle system for performing a driving function in a normal mode, which, based on a first malfunction of the vehicle system, is operated in a first emergency mode for at least partial maintenance of the driving function. Also disclosed is a computer program product and a transportation vehicle.

15 Claims, 3 Drawing Sheets

(56) References Cited

FOREIGN PATENT DOCUMENTS

| | | |
|---|---|---|
| DE | 102011002911 A1 | 7/2012 |
| DE | 102011121260 A1 | 6/2013 |
| DE | 102013001019 A1 | 7/2014 |
| DE | 102015223612 A1 | 6/2017 |
| DE | 102017213496 A1 | 11/2018 |
| DE | 112017005108 T5 | 8/2019 |
| DE | 102018213284 A1 | 2/2020 |
| DE | 102020116876 A1 | 12/2021 |
| DE | 102021103730 A1 | 8/2022 |
| GB | 2556682 A | 6/2018 |
| WO | WO-2012076215 A1 * | 6/2012 ............ B60W 30/00 |

* cited by examiner

METHOD FOR OPERATING A TRANSPORTATION VEHICLE, COMPUTER PROGRAM PRODUCT AND TRANSPORTATION VEHICLE

PRIORITY CLAIM

This patent application claims priority to German Patent Application No. 10 2022 208 643.0, filed 19 Aug. 2022, the disclosure of which is incorporated herein by reference in its entirety.

SUMMARY

Illustrative embodiments relate to a method for operating a transportation vehicle with at least one driving parameter, a computer program product, and a transportation vehicle.

BRIEF DESCRIPTION OF THE DRAWINGS

Disclosed embodiments are described in detail below with reference to the drawings. The features mentioned in the claims and in the description may be essential individually or in any combination. In the figures:

DETAILED DESCRIPTION

Figure 1:
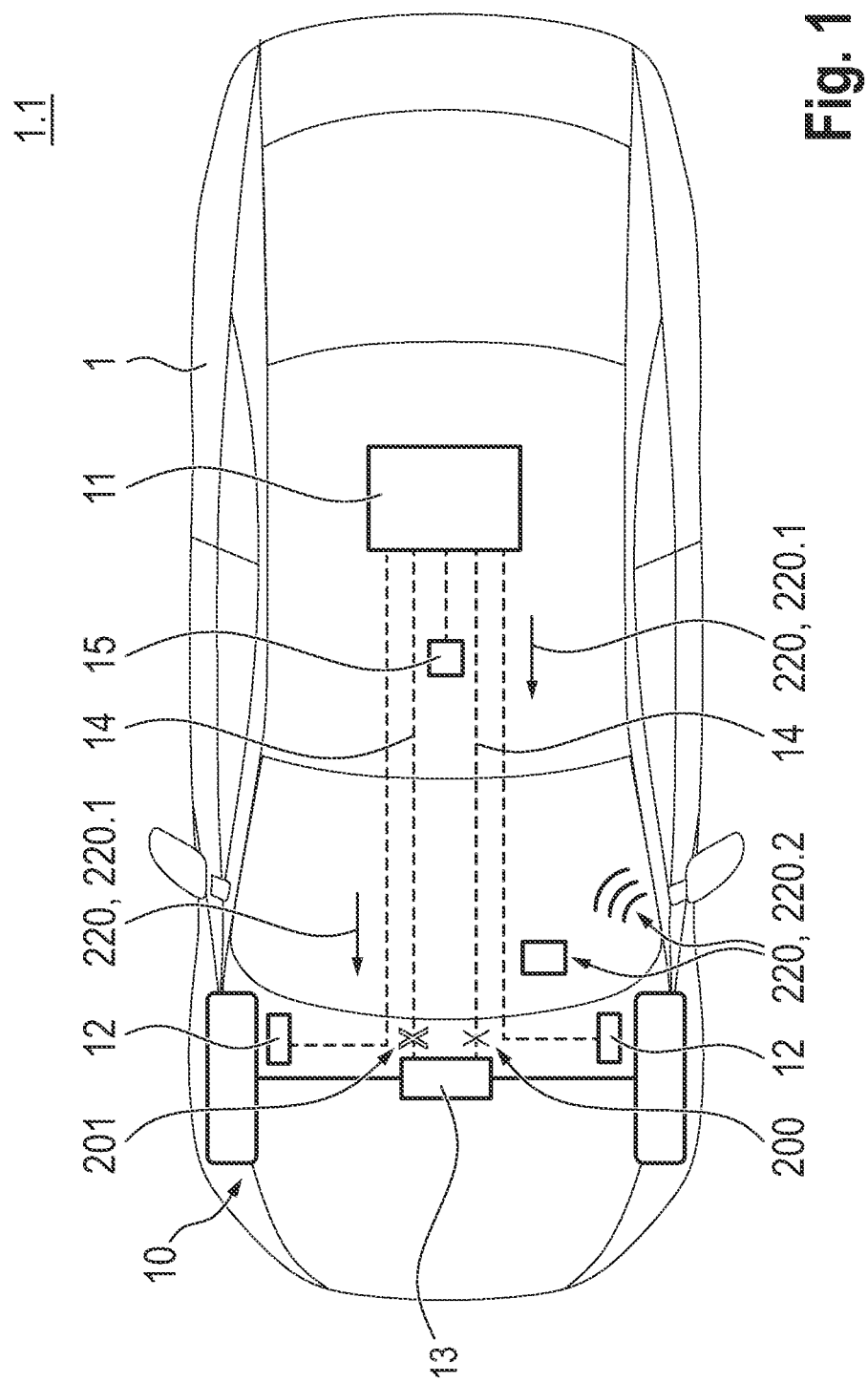
FIG. 1 schematically shows an exemplary transportation vehicle.

It is known from the prior art to provide one or more fallback levels for a partial failure of a vehicle system, for example, as a steering system or brake, in a transportation vehicle. For example, it is known from the document DE 11 2017 005 108 T5 to provide an emergency mode for a transportation vehicle when a first fault is detected. Here the driver is instructed by a warning to drive the transportation vehicle to a safe place and to stop.

With a redundant design of the safety-relevant vehicle systems, the effects on the vehicle system performance of the transportation vehicle are usually less critical when a first fault occurs, so that such a transportation vehicle can still be controlled even in driving situations with high demands on vehicle performance when a first fault occurs. However, in the event of the occurrence of a second fault following the first fault, continuous operation after the occurrence of the second fault is often not intended, so that a greater restriction of vehicle performance is possible here. However, the remaining vehicle performance in the event of a second fault is usually difficult for the driver to assess due to the vehicle system complexity of vehicle systems. It is therefore desirable to avoid the driver overestimating the transportation vehicle in the event of a first fault and continuing to operate it with a high vehicle system performance that is higher than the available vehicle system performance of the next fallback level in the case of a second fault.

Disclosed embodiments at least partially remedy the above drawbacks known from the prior art. In particular, disclosed embodiments assist a driver of a transportation vehicle in the safe operation of the transportation vehicle in the event of a malfunction.

The above is achieved by a method, a computer program product, and a transportation vehicle. Of course, features and details described in connection with the disclosed method also apply in connection with the computer program product and/or the disclosed transportation vehicle and vice versa, so that the disclosure of the individual features of the embodiments is or can always be referred to mutually.

According to a first exemplary embodiment, a method for operating a transportation vehicle is provided. The transportation vehicle has a vehicle system, in particular, safety-related, for carrying out a driving function in a normal mode. The vehicle system can also be operated in a first emergency mode depending on a first malfunction of the vehicle system to maintain at least partial or complete driving function. The method includes process operations including:

- detection of the occurrence of the first malfunction of the vehicle system, in particular, by a control unit of the transportation vehicle,
- initiating the first emergency mode depending on the first malfunction, in particular, by the control unit,
- predicting a restriction of at least one driving parameter of the transportation vehicle for a second malfunction of the vehicle system following the first malfunction, i.e., in particular, in the event of the occurrence of the second malfunction,
- outputting at least one driver indication during the first emergency mode depending on the restriction, in particular, by the control unit.

The transportation vehicle may be an electric vehicle and/or an aircraft. The vehicle system may include a steering system, in particular, as a steer-by-wire system, and/or a braking system, in particular, as a brake-by-wire system. The driving function may include, for example, steering the transportation vehicle and/or braking the transportation vehicle.

The first and/or second malfunction may include a software failure and/or hardware failure of the vehicle system or of a vehicle component affecting the vehicle system. The first malfunction of the vehicle system may include, for example, at least a partial failure or a complete failure of a system component of the vehicle system and/or of a communication path between the control unit and the system component. However, it is also conceivable that the control unit itself has a fault that leads to the malfunction of the vehicle system. The maintenance of the driving function can be achieved by a redundant provision of the driving function by the vehicle system. For example, the system component and/or the communication path can be redundant to maintain at least partial driving function. Furthermore, it may be provided that the driving function is already restricted in the first emergency mode.

On detecting the occurrence of the first malfunction, it can be detected whether the first malfunction is present and/or in what form the first malfunction is present. The initiation of the first emergency mode can be carried out automatically actively or passively, for example, by using the redundant system component and/or the redundant communication path to maintain the driving function. It may be provided that a warning message about the initiation of the first emergency mode is output to the driver, in particular, separately from the driver indication. Furthermore, it is conceivable that the driving function and/or the driving parameters may be restricted, in particular, electronically, to limit the vehicle performance that can be called up by the driver.

The prediction of the second fault can be carried out depending on the first malfunction and/or by the control unit. In particular, the second malfunction may follow the first malfunction. For example, the first and second malfunctions may be present at the same time when the second malfunction occurs. The restriction of the driving parameter may result from the second malfunction and/or may be able to be automatically predetermined based on the second malfunction in a second emergency mode of the vehicle system.

The driving parameter may include, in particular, a performance parameter of the transportation vehicle and/or of the vehicle system, for example, as speed, acceleration and/or braking power, and/or a driving characteristic of the transportation vehicle and/or the driving function, for example, as a steering angle. In particular, the driving parameter can be assigned to the driving function of the vehicle system or to another driving function of the transportation vehicle. The restriction can be understood as at least a partial reduction and/or a reduced or non-existent availability of the driving parameter compared to normal operation. In the normal mode of the vehicle system, and optionally in the first emergency mode, the driving parameter can be adjusted as intended, optionally without restriction. The restriction of the driving parameter in the event of the second malfunction may involve a limit value of the driving parameter. In particular, the second malfunction can be detected and, depending on the second malfunction, the vehicle system can be operated in a second emergency mode with the restricted driving parameter. For example, in the second emergency mode, a stop of the transportation vehicle can be forced electronically. When predicting the restriction in advance, it is beneficial to predict the performance, in particular, the maximum performance, of the transportation vehicle that can be achieved in the second emergency mode, in particular, with regard to the driving parameter, to determine the limit value of the driving parameter. Furthermore, a safety factor can be taken into account here.

The driver indication may include information about the restriction. For example, the driver indication can be output as a signal that transports the information. For example, it has been recognized in the context of the disclosure that some drivers do not fully recognize the meaning of the first malfunction and do not adequately adapt their driving style to the situation. As a result of outputting the driver indication with the method, the driver can be informed about the restriction, i.e., for example, about the vehicle performance resulting from the restriction which is expected in the event of a second malfunction. Optionally, the restriction can be conveyed to the driver qualitatively and/or quantitatively by the driver indication. In particular, the driver is thus informed about a predicted reduction in his control options for the transportation vehicle, so that he can adequately adapt his driving style to the situation.

Furthermore, in the case of a disclosed method, it may be provided that the method includes process operations:
  detection of the driver's driving behavior during the first emergency mode, in particular, by the control unit and/or a sensor system of the transportation vehicle,
  evaluation of the driving behavior depending on the restriction, in particular, by the control unit,
wherein outputting the driver indication is carried out depending on the evaluation of the driving behavior. The driver's driving behavior can be recognized on the basis of the control and/or operating behavior of the transportation vehicle by the driver. In particular, the driving parameter and/or a profile of the driving parameter can be recorded when detecting the driving behavior. Furthermore, to evaluate the driving behavior, the driving parameters can be evaluated, in particular, for the current driving situation of the transportation vehicle and/or over a predetermined period of time. For this purpose, reference requirements for the driving behavior can be determined on the basis of the predicted restriction of the driving parameter, on the basis of which the recorded driving behavior is classified as critical and/or non-critical. Furthermore, the recording and evaluation of the driving behavior can take place continuously. The driver indication may be output at a time when the driving parameter exceeds the predicted restriction for the second malfunction in the first emergency mode. In this way, the driver can be informed that the current driving behavior exceeds the performance of the transportation vehicle in the event of a second malfunction.

Furthermore, in the case of a disclosed method, it is conceivable that the detection of the driving behavior, in particular, continuously, takes place over a waiting period, in particular, before the evaluation of the driving behavior and/or the output of the driver's information is carried out. The waiting period may be fixed or dynamically defined during the method, in particular, during the recording of the driving behavior. It may be provided that outputting the driver indication takes place immediately after the waiting period or that outputting the driver indication at the beginning has a progressive output progression in which the intensity of the driver indication increases over a period of time. The progressive profile can prevent the driver from suddenly being surprised by the driver indication. By detecting over the waiting period, it can be ensured that the database is large enough for the evaluation and/or that the driving behavior by the driver is intended. For example, the time period can be greater than or equal to 5 minutes. In this way for example, it can be ruled out that the driver may activate a temporarily high power demand on detecting and evaluating the driving behavior not only based on a specific driving situation.

Within the scope of the disclosure, it is also conceivable that outputting the driver indication takes place haptically, in particular, by actuating the vehicle component for carrying out a vibration. The haptic output of the driver indication can be made, for example, via the steering of the transportation vehicle, in particular, through feedback in the steering wheel, vibration in the steering wheel, a changed counter-force and/or a delayed or non-linear implementation of the steering demand. Furthermore, it is conceivable that a haptic output of the driver indication can take place, for example, by a drive train and/or a braking system of the transportation vehicle, in particular, by pulsating wheel pressures and/or a pulsating drive control to induce vibrations into the transportation vehicle when the brake system is applied and/or in the event of a changed pedal travel of a pedal for actuating the drive train or the brake system. Thanks to the haptic output, the driver can receive the driver indication regardless of background noise and/or a wealth of information in the field of vision. This can make it easier for the driver to receive the driver indication.

Optionally, with a disclosed method, it may be provided that the output of the driver indication takes place as an output of visual and/or acoustic information. The visual and/or acoustic information may include a warning message depending on the restriction of the driving parameter. The visual information can be output via a display device of the transportation vehicle, for example, via a screen and/or a head-up display. For example, the visual output allows the driver to be notified in addition to a warning to initiate the first emergency mode. Furthermore, the driver indication can replace the warning when the driver indication is output, so that the driver can easily recognize the increased relevance of his driving behavior. The acoustic information can be output, for example, by a loudspeaker of the transportation vehicle and/or by technical vibrations, which are caused, for example, by actuating valve circuits and/or an electromotive hum. In the case of the acoustic output of the driver indication, for example, an entertainment medium, such as music or a radio broadcast, can be interrupted in the transportation vehicle. The acoustic and/or visual information can be a familiar medium for the driver to receive the warning message, which can avoid irritation of the driver. Furthermore, the acoustic and/or visual information may include information, in particular, quantitative information, such as legible and/or audible speech information about the restriction. This allows an experienced driver to better assess the restriction.

Furthermore, with a disclosed method, it may be provided that multiple driver indications, in particular, with different output modes and/or depending on the evaluation of the driving behavior, are output one after the other and/or at a time interval relative to each other. For example, to realize a progressive profile when outputting, the driver instructions can be output one after the other. For example, the driver indications can have a predefined sequence. In particular, it may be provided that visual and/or acoustic information is first output and then a haptic output of a driver indication takes place. In particular, the haptic output can only take place if the driving behavior of the driver continues to be rated as critical according to the visual and/or acoustic information. This allows the driver to be made more clearly aware of the predicted restriction.

Furthermore, with a disclosed method, it is conceivable that the surroundings of the transportation vehicle are detected in the first emergency mode, wherein the surroundings of the transportation vehicle are taken into account when predicting the restriction and/or evaluating the driving behavior. The detection of the surroundings of the transportation vehicle can be carried out by a sensor system, in particular, a forward looking sensor system, of the transportation vehicle. When detecting the surroundings of the transportation vehicle, for example, existing and/or forecast weather conditions, route conditions and/or navigation data of the transportation vehicle can be detected. In addition or alternatively, the method may provide that a vehicle condition of the transportation vehicle is detected in the first emergency mode and that the vehicle condition is taken into account when predicting the restriction and/or evaluating the driving behavior. The condition of the transportation vehicle may include, for example, a condition of transportation vehicle tires and/or a state of wear of the vehicle system. Taking into account the surroundings and/or the condition of the transportation vehicle can improve accuracy in predicting the restriction and/or evaluating the driving behavior, in particular, with regard to the current driving situation.

It is also conceivable with a disclosed method that, in addition to outputting the driver indication, a vehicle reaction is carried out to restrict the driving behavior depending on the predicted restriction of the driver indication, the vehicle condition, the surroundings of the transportation vehicle and/or the evaluation of the driving behavior. In the case of the vehicle reaction, for example, a speed and/or acceleration of the transportation vehicle can be limited, especially electronically, to a reduced maximum value. The vehicle system or another vehicle system can be actuated to carry out the vehicle reaction. In particular, the driving behavior can be limited by the fact that the driving function and/or a further driving function of the transportation vehicle is only possible to a limited extent. By restricting the driving behavior, the driver can be actively prevented from operating the transportation vehicle with a high power demand in the first emergency mode for a longer period of time and/or in adverse driving conditions. In particular, by restricting driving behavior depending on the evaluation of the driving behavior, the driver's driving behavior can be sanctioned. By restricting the driving behavior depending on the predicted restriction of the driver indication, the condition of the transportation vehicle and/or the surroundings of the transportation vehicle, the vehicle reaction can be carried out dynamically and/or in a situation-appropriate manner.

According to another exemplary embodiment, a computer program product is provided. The computer program product contains commands which, when executed by a control unit, cause the control unit to carry out a disclosed method.

Thus, a disclosed computer program product brings with it the same benefits as have already been described in detail with reference to a disclosed method. In particular, the method may be a computer-implemented method. The computer program product may be implemented as a computer-readable instruction code. Furthermore, the computer program product may be stored on a computer-readable storage medium such as a data disk, a removable drive, a volatile or non-volatile memory, or a built-in memory/processor. In addition, the computer program product may be deployable or made available on a network, such as the Internet, from which it can be downloaded or executed online by a user on demand. The computer program product can be realized both by software and by one or more special electronic circuits, i.e., in hardware or in any hybrid form, i.e., by software components and hardware components.

According to another exemplary embodiment, a transportation vehicle is provided. The transportation vehicle has a vehicle system, optionally safety-related, for carrying out a driving function in the normal mode. Depending on a first malfunction of the vehicle system, the vehicle system can be operated in a first emergency mode to at least partially maintain the driving function. Furthermore, the transportation vehicle, optionally the vehicle system, has a control unit for carrying out a disclosed method.

Thus, a disclosed transportation vehicle brings with it the same benefits as have already been described in detail with reference to a disclosed method and/or a disclosed computer program product. The control unit may contain a processor and/or a microprocessor. Furthermore, the control unit may be at least partially or fully integrated into a central control unit of the transportation vehicle. However, it is also conceivable that the control unit is at least partially or completely integrated into one or more decentralized control units of the transportation vehicle and/or the vehicle system.

In the following description of some exemplary embodiments, the same reference signs are also used for the same technical features in different exemplary embodiments.

Figure 2:
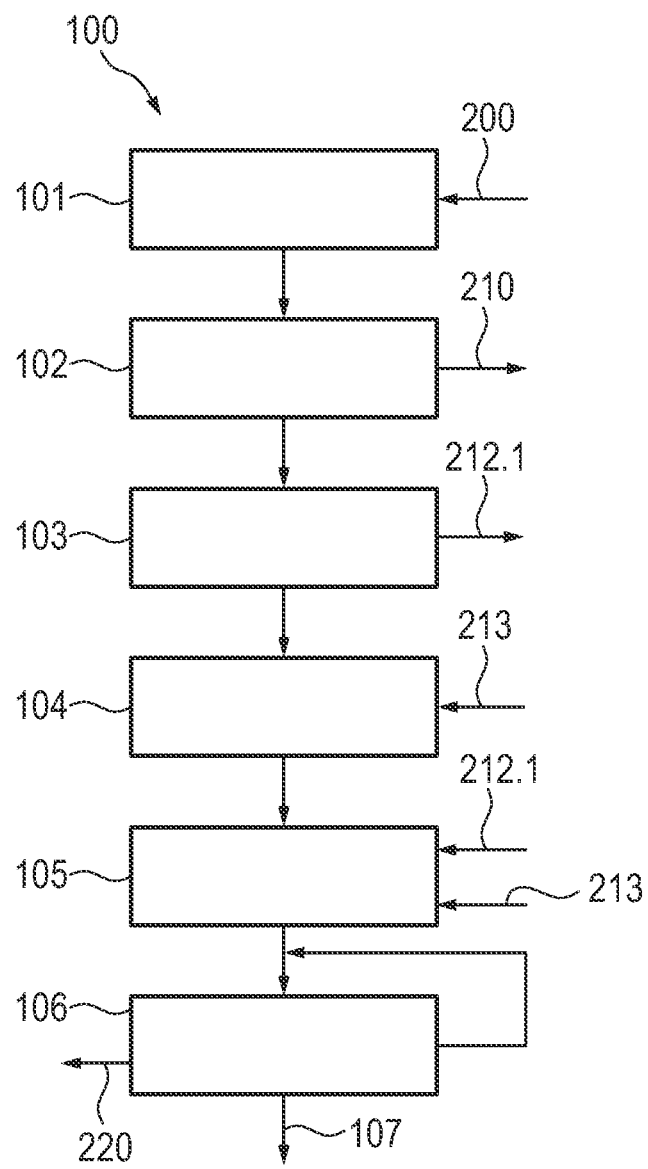
FIG. 2 schematically shows a sequence of an exemplary method for operating the transportation vehicle.

FIG. 1 shows a transportation vehicle 1 with a vehicle system 10, in particular, safety-relevant, for carrying out a driving function in the normal mode of the vehicle system 10. In the present exemplary embodiment, the vehicle system 10 is a steering system of the transportation vehicle 1, in particular, as a steer-by-wire system. However, it is also conceivable that the vehicle system 10 is a braking system, for example, as a brake-by-wire system, or another on-board system of the transportation vehicle 1. Furthermore, the transportation vehicle 1 has a control unit 11 for carrying out a disclosed method 100 for operating the transportation vehicle 1. For this purpose, for example, a computer program product may be provided which includes commands which, when executed by a control unit 11, cause the control unit 11 to carry out the method 100. A sequence of the method 100 is shown schematically in FIG. 2.

Depending on a first malfunction 200 of the vehicle system 10, the vehicle system 10 can be operated in a first emergency mode 210 for at least partial maintenance of the driving function. As shown, the first malfunction 200 may include, for example, a failure of a communication line 14 between the control unit 11 and a steering unit 13. The first emergency mode 210 thus forms a first fallback level for a first fault case. Optionally, the vehicle system 10 can also be operated in a second emergency mode depending on a second malfunction 201 of the vehicle system 10 following the first malfunction 200 to at least partially maintain the operation of the transportation vehicle 1. In the second emergency mode, for example, the driving function of the vehicle system 10 may or may not be available to a limited extent. For example, the second malfunction 201 may include a failure of another, redundant communication line 14 between the control unit 11 and a steering unit 13. In particular, the second emergency mode thus forms a second fallback level for a second fault case.

With the method 100, a detection 101 of an occurrence of the first malfunction 200 of the vehicle system 10 takes place. Here the failure of the communication line 14 of the first malfunction 200 can be detected by the control unit 11, for example. Depending on the first malfunction 200, the first emergency mode 210 is then initiated 102. For example, the control unit 11 can actively switch to the first emergency mode 210 or passively continue communication via the remaining communication line 14.

To be able to estimate the possible effects of the second malfunction 201 on the transportation vehicle 1, a prediction 103 of a restriction 212.1 of at least one driving parameter 212 of the transportation vehicle 1 for the second malfunction 201 of the vehicle system 10 also takes place. The prediction 103 can take place, for example, after the initiation 102 of the first emergency mode 210, in particular, depending on the first malfunction 200. For this purpose, for example, a malfunction type of the first malfunction 200 can be determined to predict the restriction 212.1 of the driving parameter 212. For example, the driving parameter 212 may include a steering angle and/or speed of the vehicle system 10.

Figure 3:
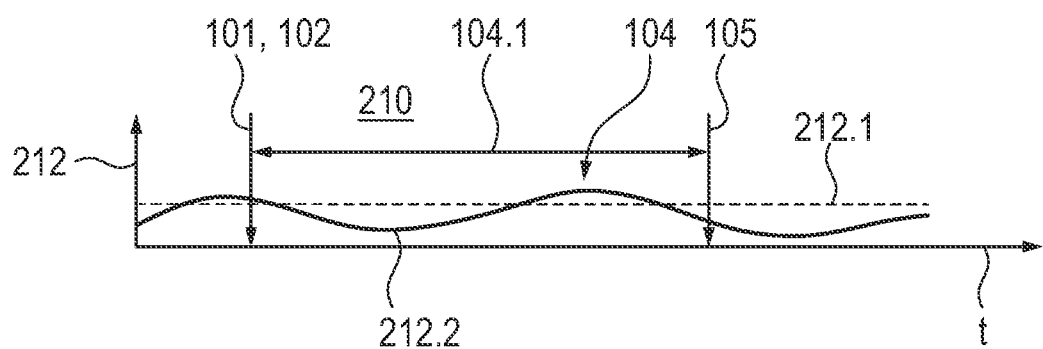
FIG. 3 schematically shows a profile of a driving parameter of the transportation vehicle over a period of time.

Furthermore, a detection 104 of a driving behavior 213 of the driver during the first emergency mode 210 takes place. As shown in FIG. 3, a profile 212.2 of the driving parameter 212 over time t can be detected by sensors. Optionally, the detection 104 of the driving behavior 213 takes place over a waiting period 104.1 to create a database and/or to be able to classify the driving behavior 213 as temporary or permanent. After the waiting period 104.1, an evaluation 105 of the driving behavior 213 depending on the restriction 212.1 is carried out. For example, when evaluating 105 the driving behavior 213, the driving behavior 213 may be classified as critical if the driver exceeds the predicted restriction 212.1 of the driving parameter 212, frequently and/or permanently, during the first emergency mode 210. In addition or alternatively, in the first emergency mode 210 the surroundings 1.1 of the transportation vehicle 1 can be detected by a sensor system 15, for example, as a front camera, and/or by the control unit 11.

Depending on the predicted restriction 212.1 of the driving parameter 212, the output 106 of at least one driver indication 220 also takes place during the first emergency mode 210. Optionally, the evaluation 105 of the driving behavior 213 and the surroundings of the transportation vehicle 1.1 are taken into account here. For example, the output 106 of the driver indication 220 can only take place if the driving behavior 213 is assessed as critical in the detected surroundings of the transportation vehicle 1.1. For example, the output 106 of the driver indication 220 may be the output 106 of visual and/or audible information 220.2 for the driver, as shown in FIG. 1. Furthermore, it is conceivable that the output 106 of the driver indication 220 takes place haptically by carrying out the actuation 220.1 of the vehicle component 12, such as a wheel brake, to perform a vibration to induce into the transportation vehicle 1. Optionally, multiple driver indications 220 are output, depending on the evaluation 105 of the driving behavior 213, one after the other with different output types and/or with a time interval between them.

In addition to the output 106 of the driver indication 220, in particular, a vehicle reaction 107 is carried out to restrict the driving behavior 213 depending on the predicted restriction 212.1 of the driver indication 220 from the surroundings of the transportation vehicle 1.1 and/or the evaluation 105 of the driving behavior 213. As a result, the driving behavior 213 of the driver can be restricted electronically, in particular, sanctioned, to improve the safety of the transportation vehicle 1 in the first emergency mode 210 and to bring the transportation vehicle 1 into a safe driving mode in preparation for a possible occurrence of the second emergency mode.

The foregoing explanation of the exemplary embodiments describes the present disclosure exclusively in the context of examples. Of course, individual features of the disclosed embodiments, if technically reasonable, can be freely combined with each other without departing from the scope of the present disclosure.

REFERENCE SIGN LIST 1 transportation vehicle
1.1 surroundings of the transportation vehicle
10 vehicle system
11 control unit
12 vehicle component
13 steering unit
14 communication line
15 sensors
100 method
101 detecting the occurrence of 200
102 initiation of 210
103 predetermining 212.1
104 detecting 213
104.1 waiting period
105 evaluation of 213
106 outputting 220
107 vehicle reaction
200 first malfunction
201 second malfunction
210 first emergency mode
212 driving parameter
212.1 restriction
212.2 profile of 212
213 driving behavior
220 driver indication
220.1 actuation
220.2 information
t time

The invention claimed is:
1. A transportation vehicle comprising:
a vehicle system for carrying out a driving function in a first mode, wherein, in response to a first malfunction of the vehicle system, the vehicle system is operated in a second mode to at least partially maintain in the driving function; and a control unit configured to perform:
  detection of the first malfunction of the vehicle system,
  automatic initiation of the second mode in response to the detection of the first malfunction, wherein, the automatic initiation of the second mode electronically restricts the driving function to limit the vehicle performance that can be activated by a driver,
  prediction of a restriction of at least one driving parameter of the transportation vehicle for a second malfunction of the vehicle system following the detection of the first malfunction,
  control of detection of a driving behavior of the driver during the second mode,
  evaluation of the driving behavior based on the restriction, and
  output of at least one driver indication during the second mode based on both the predicted restriction for the second malfunction and the evaluation of the driving behavior thereby assisting the driver of the transportation vehicle in informed operation of the transportation vehicle following the first malfunction, wherein the informed operation during the second mode indicates whether a current driving behavior of the driver exceeds the performance of the transportation vehicle that will be available in the event of the second malfunction that will trigger a third mode that automatically further restricts the driving function to further limit in the vehicle performance that can be activated by the driver.

2. The transportation vehicle of claim 1, wherein the detection of the driving behavior occurs over a waiting period before the evaluation of the driving behavior and output of the driver indication are performed.

3. The transportation vehicle of claim 1, wherein output of the driver indication takes place haptically by initiation of actuation of the vehicle component for carrying out a vibration.

4. The transportation vehicle of claim 1, wherein output of the driver indication occurs by output of visual and/or acoustic information.

5. The transportation vehicle of claim 1, wherein multiple driver indications are output with different output one after the other and/or with a time interval between the outputs based on the evaluation of the driving behavior.

6. The transportation vehicle of claim 1, wherein the surroundings of the transportation vehicle are detected in the second mode, wherein the surroundings of the transportation vehicle are taken into account when predicting the restriction and/or when evaluating the driving behavior.

7. The transportation vehicle of claim 1, wherein, in addition to output of the driver indication, a vehicle reaction is performed to restrict the driving behavior based on the predicted restriction of the driver indication, the surroundings of the transportation vehicle and/or the evaluation of the driving behavior.

8. A method for operating a transportation vehicle that includes a vehicle system for carrying out a driving function in a first mode, wherein, in response to a first malfunction of the vehicle system, the vehicle system is operated in a second mode for atleastpartial maintenance of the driving function, the method comprising:
  detecting the occurrence of the first malfunction of the vehicle system;
  automatically initiating the second mode in response to the detection of the first malfunction, wherein, the automatic initiation of the second mode electronically restricts the driving function to limit the vehicle performance that can be activated by a driver;
  predicting a restriction of atleast one driving parameter of the transportation vehicle for a second malfunction of the vehicle system following the detected first malfunction;
  detecting a driving behavior of the driver during the second mode;
  evaluating the driving behavior based on the restriction; and
    outputting at least one driver indication during the second mode based on both the predicted restriction for the second malfunction and the evaluation of the driving behavior thereby assisting the driver of the transportation vehicle in informed operation of the transportation vehicle following the first malfunction, wherein the informed operation during the second mode indicates whether a current driving behavior of the driver exceeds the performance of the transportation vehicle that will be available in the event of the second malfunction that will trigger a third mode that automatically further restricts the driving function to further limit the vehicle performance that can be activated by the driver.

9. The method of claim 8, wherein the detection of the driving behavior occurs over a waiting period before the evaluation of the driving behavior and outputting the driver indication are performed.

10. The method of claim 8, wherein the outputting of the driver indication takes place haptically by initiating actuation of the vehicle component for carrying out a vibration.

11. The method of claim 8, wherein the outputting of the driver indication occurs by outputting visual and/or acoustic information.

12. The method of claim 8, wherein multiple driver indications are output with different output one after the other and/or with a time interval between the outputs based on the evaluation of the driving behavior.

13. The method of claim 8, wherein the surroundings of the transportation vehicle are detected in the second mode, wherein the surroundings of the transportation vehicle are taken into account when predicting the restriction and/or when evaluating the driving behavior.

14. The method of claim 8, wherein, in addition to outputting the driver indication, a vehicle reaction is performed to restrict the driving behavior based on the predicted restriction of the driver indication, the surroundings of the transportation vehicle and/or the evaluation of the driving behavior.

15. A computer readable medium include a computer program containing instructions which, when executed by a control unit, cause the control unit to perform the method of claim 8.

* * * * *